C. R. DAVIS.
PLANTER.
APPLICATION FILED AUG. 2, 1911.
1,073,405.
Patented Sept. 16, 1913.
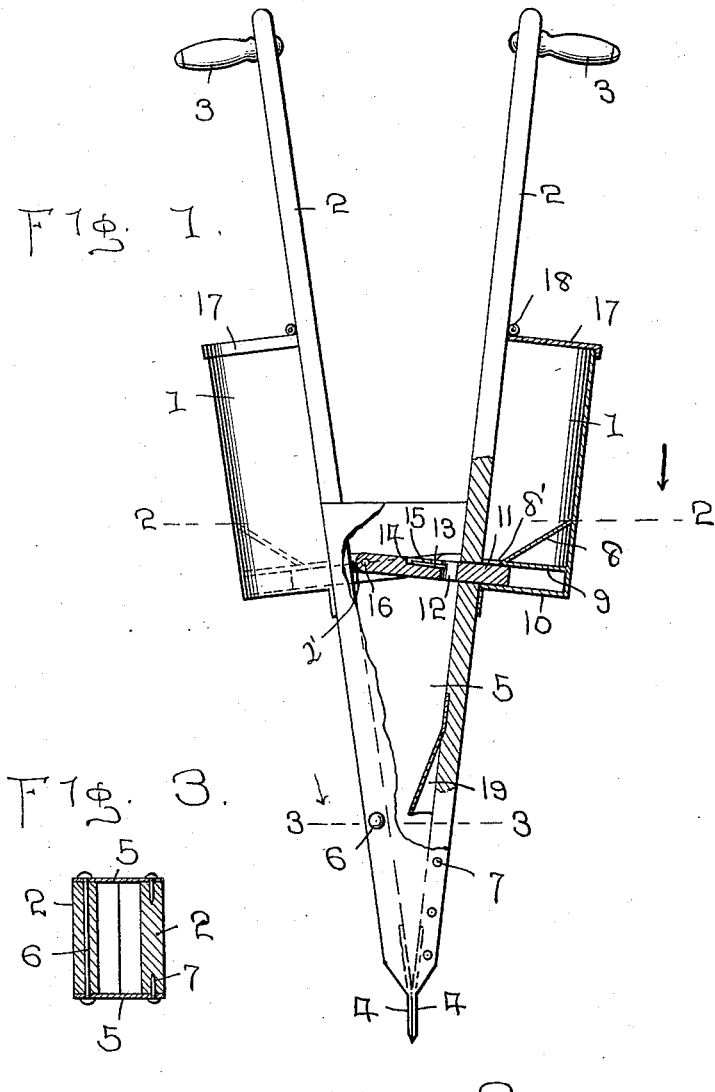
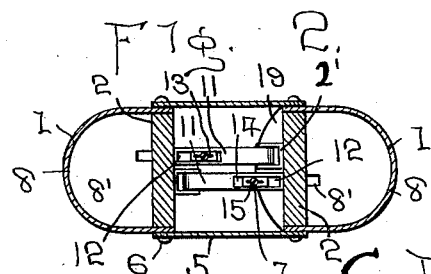
WITNESSES:
INVENTOR
C. R. Davis
BY
Attorneys

UNITED STATES PATENT OFFICE.

CHARLES ROBT. DAVIS, OF MARLINTON, WEST VIRGINIA.

PLANTER.

1,073,405. Specification of Letters Patent. Patented Sept. 16, 1913.

Application filed August 2, 1911. Serial No. 641,994.

*To all whom it may concern:*

Be it known that I, CHARLES ROBERT DAVIS, a citizen of the United States, residing at Marlinton, in the county of Pocahontas and State of West Virginia, have invented certain new and useful Improvements in Planters; and I do hereby declare the following to be a full, clear, and exact description of the invention, such as will enable others skilled in the art to which it appertains to make and use the same.

This invention relates to planters and more particularly to hand operated planters.

An object of the invention is to provide a planter having seed receptacles and pivoted planting jaws below said receptacles and handles above said receptacles for feeding the grain from the receptacles to the jaws and for separating the jaws to plant the seeds.

Another object is to provide a planter of this character, which will be of novel form and operation and simple in construction, and, another object is to provide a planter of this character, which will be effective in use and cheap to manufacture.

Other objects and advantages will be hereinafter set forth and pointed out in the specification and claim.

In the accompanying drawings which are made a part of this application, Figure 1 is a side elevational view, some of the parts being broken away and others shown in section. Fig. 2 is a cross sectional view on the line 2—2 of Fig. 1, looking in the direction of the arrow, and, Fig. 3 is a cross sectional view on the line 3—3 of Fig. 1, looking in the direction of the arrow.

Referring to the drawings in which similar reference numerals designate corresponding parts throughout the several views, 1 indicates the hoppers, which are carried outwardly of and secured to the sides 2, to the upper ends of which are secured the oppositely directed handles 3. Secured upon the inner side of each side piece 2 and at the lower end thereof is a jaw 4, the lower projecting portions of said jaws being bent slightly outwardly, in order that they may be in parallel planes when in closed position. To the opposite vertical edges of one of the sides 2 are secured the plates 5, which are narrower at their lower ends and wider at their upper ends. The free edges of these plates 5 are pivotally secured to the vertical edges of the other side 2, by means of the pivot bolt 6 passing through these plates and said side. Suitable nails 7 or other securing means may be employed for readily securing the plates 5 to the side 2 by which they are carried.

Each hopper 1 is provided with a slanting bottom 8 slanting downwardly toward the adjacent side 2 of the planter and ending a short distance therefrom, said slanting bottom meeting with the horizontal partition 9, which is positioned a short distance above the bottom 10 of the hopper. Working between the bottom 10 and the partition 9, is the feed slide 11, which is provided with the feed opening 12, which is at times brought beneath the space between the side 2 and the junction of the slanting bottom 8 and the partition 9 to receive a predetermined quantity of the contents of the hopper and feed the same to the jaws 4 of the planter when the opening 12 is again returned to its position between the sides 2 and the plates 5, as will be understood.

It will be understood that the slides 11 are arrow and that the opening through the bottom 8' corresponds in width to the width of the vertical feed opening 12. It will also be noted that the slanting bottom 8 is continued from its junction with the partition 9 toward the side 2 of the planter and connected therewith, said continued portion being in alinement with the partition 9 and the opening 8' being within this horizontal portion of the bottom 8.

The quantity of grain entering the feed opening 12 of each slide 11 may be governed by the quantity regulating plate 13, which is slidably adjustable with a suitable recess 14 in the upper surface of the slide bar 11 and adjacent the opening 12, one end of a plate 13 projecting across the upper portion of said feed opening and the plate being secured in adjusted position by suitable adjusting screws 15, passing through a slot therein and into the bar 11. The end of the bar 11 adjacent the feed opening 12 normally rests beneath the opening 8' and between the bottom 10 and the partition 9 of the hopper, while the opposite end of the bar 11 is pivoted by means of the pivot pin 16 between the ears 2' carried upon the inner side of the opposite side 2 of the planter.

The upper open end of each hopper 1 is closed by means of the hinged cover 17, preferably hinged, as shown at 18, to the outer surface of the adjacent side 2 of the hopper. The hoppers 1 are positioned about midway the length of the sides 2 and the plates 5 extend upwardly from the jaws 4 to a short distance above the slide feed bars 11.

Carried by one of the sides 2 and secured to its inner face is the curved spreader 19, which is secured at its upper edge to the side 2 in any preferred manner and is flared outwardly and downwardly, the center of the lower edge thereof being about midway of the sides 2 and near the pivotal connection of the plates 5 with the pivoted side 2. This spreader will serve to spread the charge from the hopper carried by the same side 2 as the spreader and mix the same with the grain or other charge from the opposite hopper, as these two charges pass the spreader on their way to the jaws 4.

This device is intended to be used for planting or replanting and is used in the following manner: The hoppers 1 are filled with grain, or if desired manure or fertilizer may be placed in one of the hoppers and the grain in the other, or the device may be employed for planting corn and peas, one hopper being used for each, as will be understood. When it is desired to deposit grain between the growing stalks or in other places where the corn has been destroyed by crows, etc., the handles 3 are grasped and forced toward one another to swing the sides 2 upon the pivot 6 and spread the jaws 4, bringing the feed openings 12 beneath the openings 8' and allowing the contents of the hoppers 1 to drop in the feed openings 12 and fill the latter. The handles 3 are then separated, drawing the free ends of the slide bars 11 through the sides 2 until the jaws 4 are brought together to limit this movement, at which time the feed openings 12 will have assumed their positions between the plates 5 and allowed the charges to drop therefrom upon the spreader 19, which serves to spread and thoroughly mix these charges, after which they may drop to the jaws 4. The jaws 4 are then pressed into the ground and the handles 3 pressed together to separate the jaws while within the soil, allowing the charge to drop between said jaws and into the opening formed by forcing the jaws into the ground and spreading them. The handles 3 are then drawn from one another, causing the jaws 4 to again close, and the device is lifted out of the ground and carried to the next place where the operation is to be repeated. During the spreading of the jaws 4 while within the ground, the slide bars 11 reciprocate between the bottoms 10 and partitions 9 of the hoppers 1 and the feed openings 12 are again filled with grain through the openings 8' of the bottoms 8 and during the drawing apart of the handles 3 to close the jaws 4, the bars move outwardly and the charges drop from the feed openings 12 to the bottom of the planter, said charges being thoroughly mixed by the spreader and mixer 19, as previously described. By the time the charges from the feed slide bars 11 reach the jaws 4 the latter will have been closed and prevent said charges from escaping until the jaws are again separated. It will be seen that this operation may be repeated until the contents of the hoppers 1 are exhausted, after which the hoppers may be refilled.

It will be apparent that this device may be used for various planting or replanting operations and may be employed for any grain or grains desired. As the parts are of simple formation and operation there is practically no liability of the device getting out of order. It will also be seen that this planter may be manufactured and sold at an extremely small expense and will require only a small amount of space when not in use. It will also be seen that the various parts may be manufactured of light material, making the implement light and easy to handle and manipulate.

What I claim is:

A hand planter comprising a pair of side pieces, a hopper on the outside of each side piece each having a seed outlet into the space between the side pieces, the bottom in each hopper being downwardly inclined to its seed outlet, a pair of rigid plates extending from above the seed outlets to the bottoms of the side pieces, means securing the plates rigidly to one side piece and pivotally to the other side piece and forming a discharge conduit for the seed from both hoppers, valves to regulate the discharge of seed from the hoppers into the conduit, and an inclined plate secured to one wall of the conduit in the path of the seed discharged from one hopper to cause it to mix with the discharge from the other hopper.

In testimony whereof I have signed my name to this specification in the presence of two subscribing witnesses.

CHARLES ROBT. DAVIS.

Witnesses:
H. K. BRIGHT,
J. K. MARSHALL.

---

Copies of this patent may be obtained for five cents each, by addressing the "Commissioner of Patents, Washington, D. C."